Dec. 3, 1968   S. H. AULD   3,414,790
PHOTOELECTRIC MOTOR SPEED CONTROL
Filed Aug. 21, 1964   3 Sheets-Sheet 1
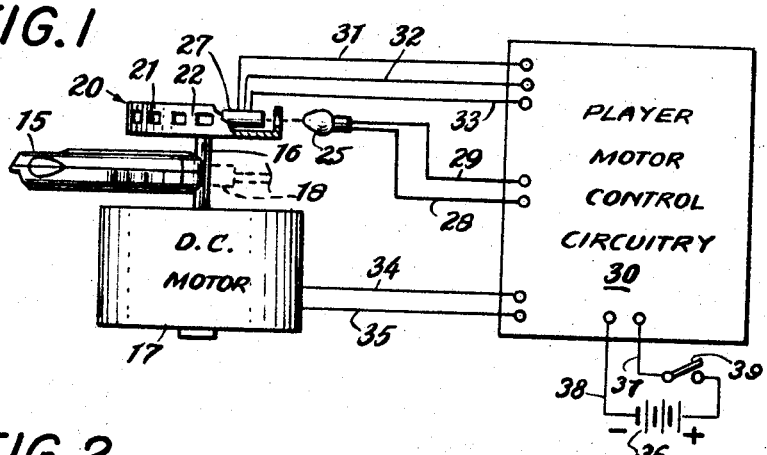
FIG.1
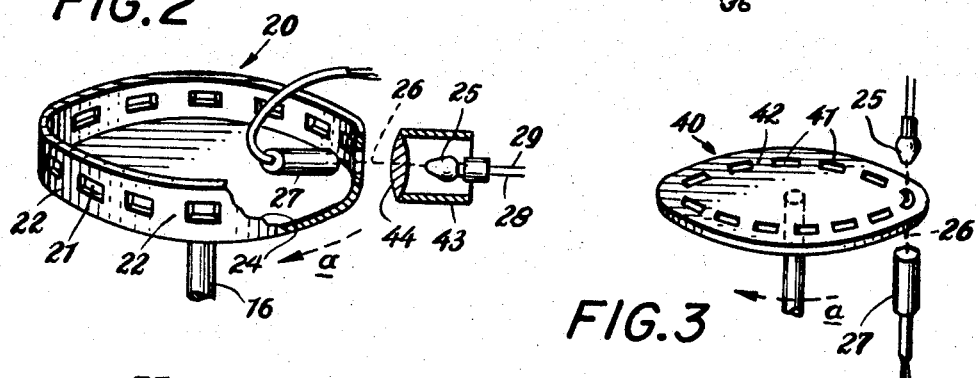
FIG.2
FIG.3
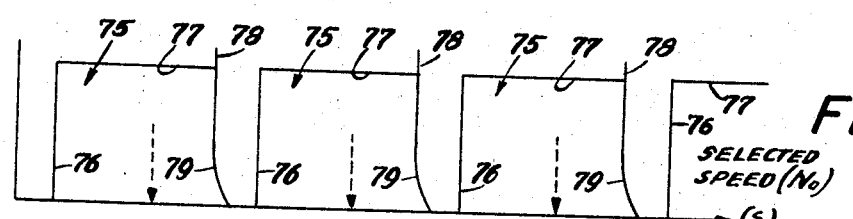
FIG.4
SELECTED SPEED (N₀)
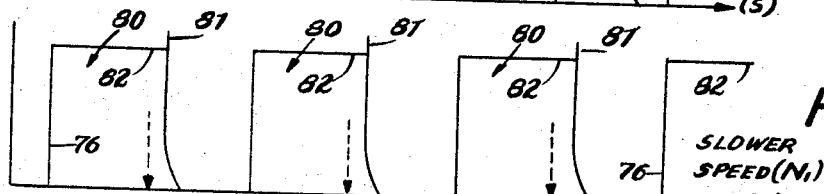
FIG.5
SLOWER SPEED (N₁)
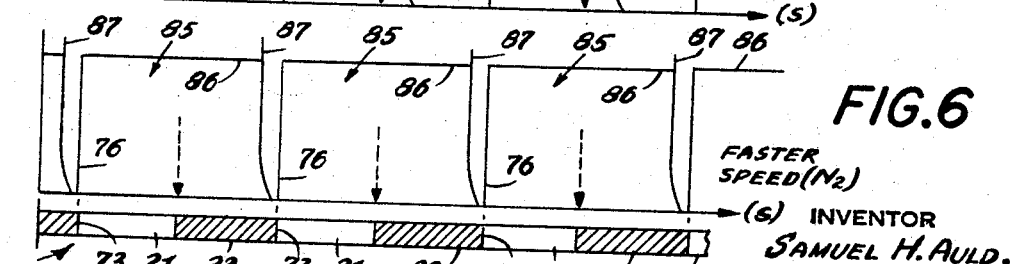
FIG.6
FASTER SPEED (N₂)
INVENTOR
SAMUEL H. AULD,
BY
R. A. Mann
his ATTORNEY

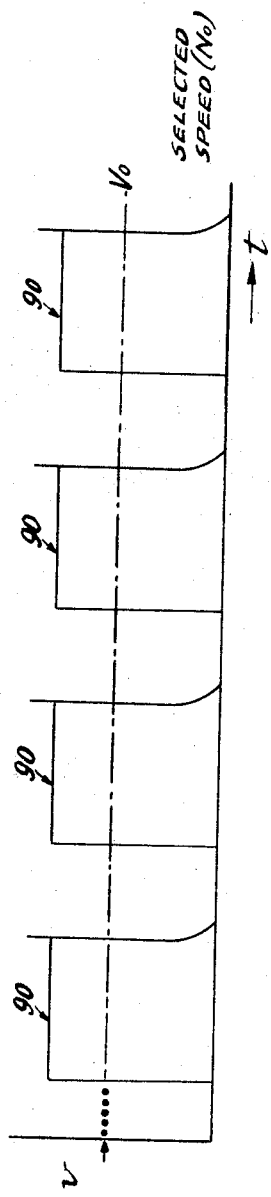
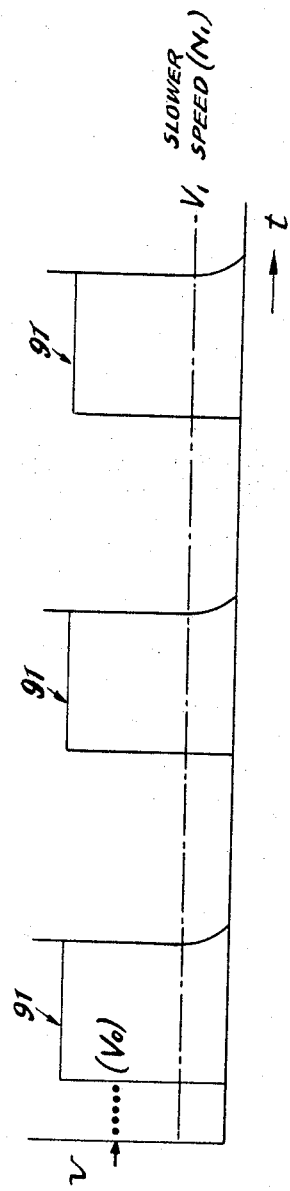
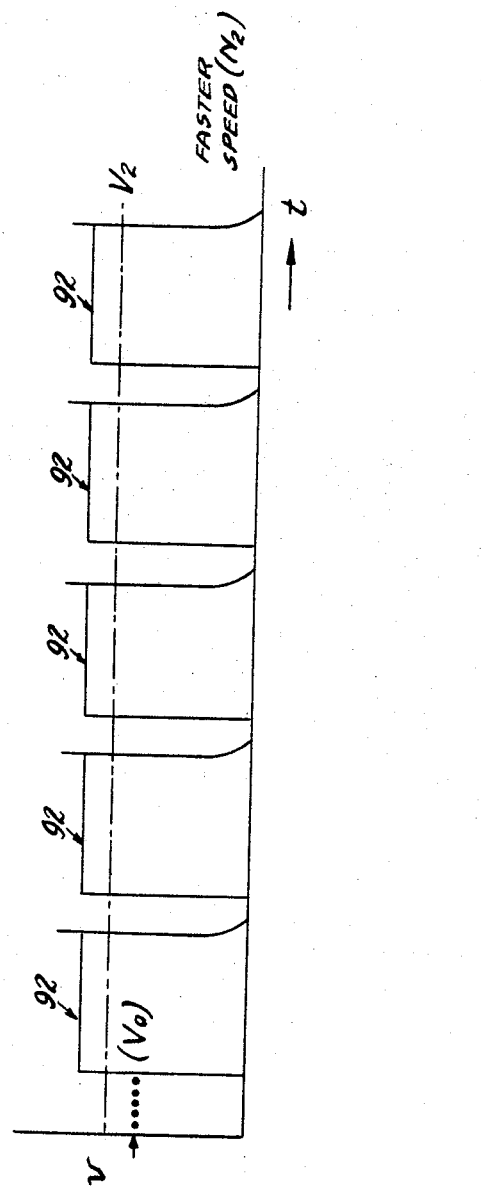

United States Patent Office 3,414,790
Patented Dec. 3, 1968

3,414,790
PHOTOELECTRIC MOTOR SPEED CONTROL
Samuel H. Auld, Wichita, Kans., assignor to Lear Jet Corporation, Wichita, Kans., a corporation of Delaware
Filed Aug. 21, 1964, Ser. No. 391,262
18 Claims. (Cl. 318—313)

This invention relates to motor speed control circuits, and more particularly relates to novel circuits and means for the operation of direct current motors at precise predetermined speeds.

A motor used for driving the magnetic tape of a player is desirably controlled to operate at an exact and constant speed to reproduce quality music. An important basis of faithful sound playback is to maintain a constant speed for the tape past the magnetic head. Variations in tape speed cause the aberations known as flutter and wow that reduce the quality of the reproduced sound. Reducing the number of elements in the tape drive and handing mechanism permits improvement of acoustic clarity. Elimination of the commonly used belt and pulley, and their bearings, contributes materially to this objective. Direct motor drive of the tape through its shaft as capstan is the simplest approach, is more reliable having the least mechanism than other drive systems.

It is an important objective of the present invention to control the speed of a direct current motor to a precise predetermined r.p.m. value, and further to operate it at a constant angular velocity within each revolution. A speed sensor is attached to the motor shaft, and its angular operation is translated by the electronic control circuit of the invention, to initiate direct control of the motor through distinct small fractions of its each turn. The motor speed may thus be said to be digitialized with respect to time, and the corrective control related to a presetable signal reference in the control circuit. A direct current analog of the motor speed is provided for the control action. The resultant constant angular velocity of the motor output shaft thereby motivates the magnetic tape direcly through the shaft or an attached capstan.

The uniform angular velocity output at the motor shaft afforded by the present invention results despite voltage changes over a wide range, wide ambient temperature changes, mechanical eccentricity in the tape cartridge, mechanical impacts, or road bumps when the player is in an automobile. The acoustic performance of a magnetic tape player with the motor control system hereof is crisp, clear, clean and authentic even in mobile use or adverse environment. It is very practicable for stereophonic dual-track music reproduction. The motor control system, hereof, is of course applicable in other fields.

The above and further features, advantages and objects of the present invention will become more apparent from the following description of an exemplary embodiment thereof, illustrated in the accompanying drawings, in which:

FIG. 1 is a diagrammatic showing of the motor control system of the invention.

FIG. 2 is an enlarged diagrammatic illustration of one form of the optical speed sensor of the system of FIG. 1.

FIG. 3 is a modified motor speed sensor in diagrammatic form.

FIGS. 4, 5 and 6 are curves showing the waveform of the signals at point A of the circuit of FIG. 10, as related to the shutter wheel.

FIGS 7, 8 and 9 are waveform curves corresponding to FIGS. 4, 5 and 6 but referenced to a time basis.

Figure 10:
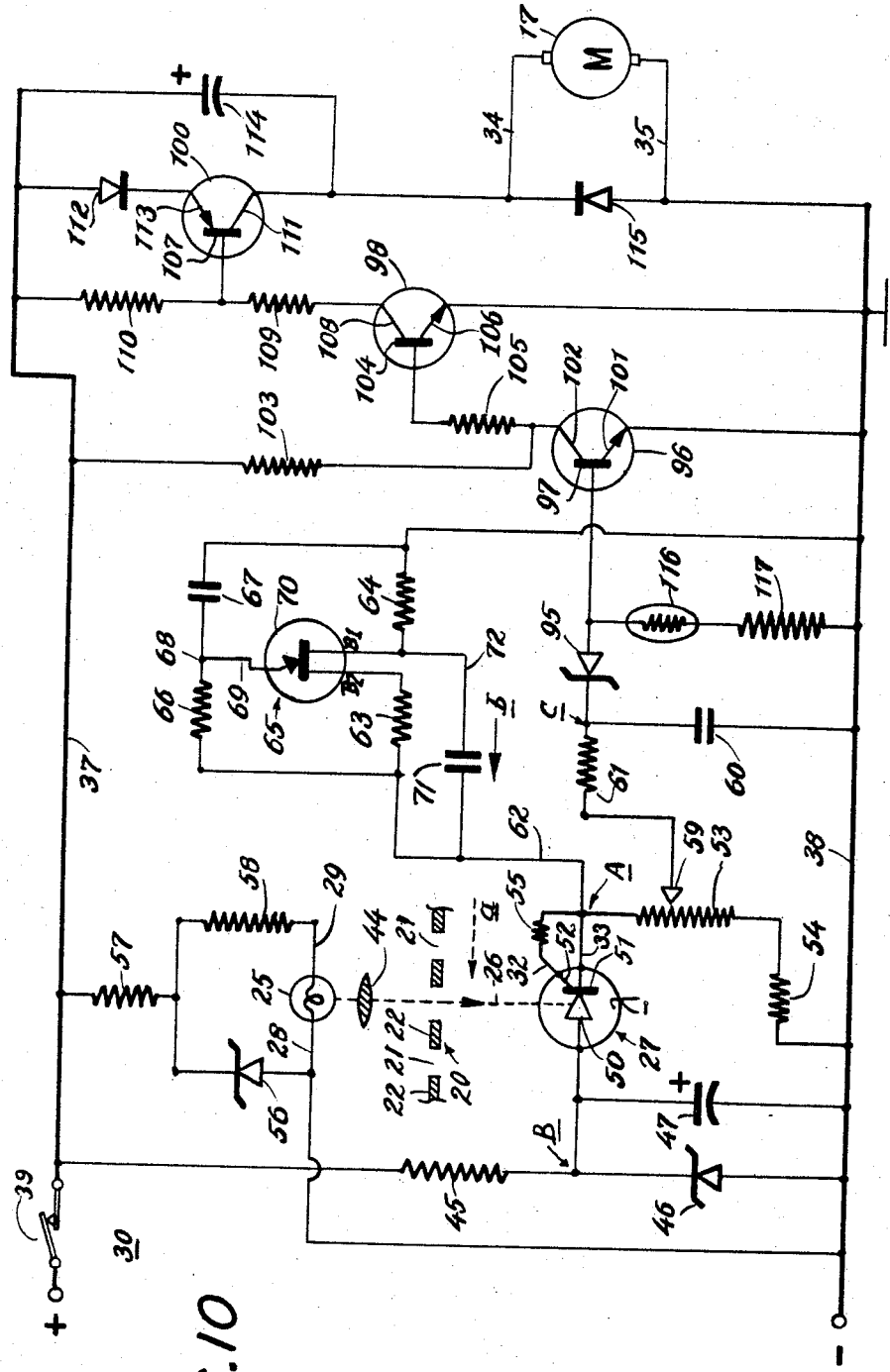
FIG. 10 is a schematic diagram of the exemplary motor control circuit.

The magnetic tape player of FIG. 1 contains a cartridge 15 within which is a reel of magnetic tape in endless configuration. The shaft 16 of the motor 17 serves as a capstan to directly drive the tape within cartridge 15. Such direct tape drive and cartridge arrangement is shown in Patent No. 3,400,227, issued Sept. 3, 1968, and assigned the same assignee. The contained magnetic tape passes across the face of the magnetic head indicated at 18. The shaft 18 is pressed against the tape and a pinch roller contained within the cartridge (not shown) to drive the tape past the head at the constant speed, e.g., 3.75 inch per second.

The speed sensor hereof is a light chopper or shutter wheel 20 containing a number of alternated open-slotted portions 21 and opaque portions 22. Wheel 20 comprises a disc 23 secured to the end of motor shaft 16, and an annular strip 24 in which the rectangular slots 21 are formed, see FIG. 2. An exciter lamp 25 creates a light beam 26 that shines through the slots 21 of shutter wheel 20 as it is rotated by the motor 17 in the direction a.

Lamp 25 is proportioned to provide sufficient illumination to activate the photo-sensitive pick-up component 27 on the opposite side of the slots 21. The lamp 25 is energized through leads 28, 29. The photo-component 27 is connected to the player motor control circuitry 30 by leads 31, 32, 33. The motor 17 is operated from circuit 30 through leads 34, 35. The motor control circuit 30 is schemtically represented in FIG. 10, and will be described in detail hereinafter. This circuit 30 and the motor 17 are energized by a battery 36 via leads 37, 38 and a switch 39. This switch 39 may be actuated by the insertion of the cartridge 15 into its "play" position, whereupon the drive motor 17 is directly operated through the transistorized circuit 30.

FIGS. 2 and 3 show two types of shutter wheels usable in the system of FIG. 1. The wheel 20 of FIG. 2 has the annular strip 24 with solts 24; that of FIG. 3 is a flat disk containing the alternated rectangular slots 21 and opaque portions 22 in a circumferential region near its rim. The lamp or bulb 25 is preferably enclosed in a light shield 43 to prevent stray light impinging on the photo-sensitive element 27. A lens 44 condenses the light into a suitable beam 26 directed at element 27 through the shutter slot 21 or 41.

FIG. 10 schematically represents the exemplary motor control circuit 30 for constant angular velocity and constant r.p.m. operation of the motor 17. The invention system is energized by a direct current source, such as the usual 12 volt automobile battery in vehicle installations. Other voltage levels or power supply means may be used therefor. The control circuit hereof has been found to be very stable and fully operable over a wide percentage voltage supply change from the rated or norm, at least ±35 percent. The motor 17 comes to its rated speed very rapidly upon the closing of the circuit switch 39. A motor speed of 300 r.p.m., with a capstan-shaft 16 close to one-quarter inch in diameter would directly drive the magnetic tape in the cartridge 15 at the standard speed of 3.75 inch per second. This tape speed has been found to give excellent stereophonic music reproduction within an automobile. Other tape or motor speeds may of course be employed with the invention circuitry and system.

The light beam 26 impinges upon the photo-sensitive component 27 whenever a slot 21 moves between it and lamp 25. A photo-activated silicon controlled rectifier 27 is the exemplary component herein. The unit 27 is composed of a silicon controlled rectifier containing an aperture through which light may enter and thereby activate and trigger it into conduction. Such photo-activated silicon controlled rectifiers, as circuit elements per se, are commercially available. A constant voltage is provided for the photo-SCR 27 through a voltage regulator. The voltage regulator is formed by resistor 45 in series with a Zener diode 46 across lines 37, 38, and an electrolytic filter capacitor 47. A constant voltage appears at point B (with respect to negative bus 38), and line 31 therefrom connects to anode 50 of unit 27. Its base 51 connects through lead 33, at point A, to line 38 across potentiometer 53 and a resistor 54 in series therewith. The gate 52 is coupled to the base 51 by a suitable resistance 55. A suitable photo-SCR 27 is Type 3P15. Resistance 55 at 27,000 ohms has been found to be generally satisfactory for the 3P15 type. However if such a unit 27 is above average in sensitivity to the light pulses 26, a correspondingly lower value of resistance 55 is used.

The exciter lamp 25 is preferably energized by a constant voltage source at a little below its normal operating level. This insures a long life for the lamp, and also controls the amount of illumination that impinges upon the photo-SCR 27. Also the problem of stray or excess illumination is minimized. Towards this end a Zener diode 56 is placed in series with limiting resistor 57 across the battery lines 37, 38, and a resistor 58 in series with lamp 25 across the diode 56. A lens 44 and light shield 43 about the lamp 25 directs the beam 26 to the photo-SCR 27, as shown in FIG. 2, and described above.

When no light reaches the photo-activated silicon controlled rectifier 27 it is quiescent, and does not conduct. When a slot or aperture 21 of the shutter wheel 20 is in position to pass the light beam 26 to the photo-SCR 27, it is rendered conductive. Except for a small internal voltage drop within the photo-SCR 27, substantially the full voltage from point B appears across potentiometer 53 and resistor 54. As will be shown, potentiometer 53 is a motor speed adjustment member, controllable by the setting of its arm 59. The voltage tapped at potentiometer arm 59 appears across capacitor 60, at point C, through resistor 61. Resistor 61 and capacitor 60 are proportioned to constitute an R–C filter for smoothing-out the relatively intermittent voltages fed to it from tap 59, that correspond to the waveforms at point A, to be described in detail hereinafter.

Once triggered, conduction continues through the photo-SCR 27 even after the light beam thereto is removed. To effectuate the motor speed responsive control action, the photo-SCR is rendered non-conductive in a periodic manner. To accomplish this function a unijunction transistor 65 is used, connected to generate cut-off voltage peaks in a predetermined manner. Unijunction transistor 65 becomes energized by the voltage at point A each time that the photo-SCR 27 is initiated into its conduction phase. This voltage signal A is applied by lead 62 to resistor 63 and on to base-two B2 of the transistor 65. Its base-one B1 connects to ground through resistor 64. The application of the voltage A simply energizes the unijunction transistor 65 with no further action, per se, until further activated in the manner to be set forth.

An R–C time constant circuit, resistor 66, condenser 67 is connected across the unijunction transistor 65 and resistors 63, 64. The common point 68 of the R-C network is connected by lead 69 to the emitter P-N electrode 70. When the condenser 67 becomes charged to a voltage level that causes the emitter 70 of unijunction transistor 65 to be slightly positive, the condenser thereupon fully discharges almost instantaneously through resistor 64. Such discharge produces a considerable voltage spike across the resistor 64. This voltage spike is transmitted to the cathode 51 of the photo-SCR 27 (at circuit point A) via capacitor 71 and leads 62, 72 (in the direction of arrow $b$). The conduction through the photo-SCR 27 is thereby directly cut-off, and the voltage at A falls to zero.

When the next successive aperture 21 passes light beam 26 and reactivates the photo-SCR 27, its conduction re-establishes the voltage level at point A, and recycles the unijunction transistor 65. The R–C time constant, that of resistor-condenser 66–67, basically determines the period of time between the start of conduction of the photo-SCR and the generation of the voltage spike that extinguishes it. The height and width of each signal pulse generated herein is thus essentially repeated for each activation of the photo-SCR by the light beam 26 pulses through the shutter wheel 20. However, the time-spacing between these signal pulses depends upon the relative speed of rotation of the motor (and shutter wheel) with respect to the "selected" speed therefor, $N_0$, as will be described in detail hereinafter.

The unijunction spikes are proportioned to be of such voltage level as to raise the voltage of the cathode 51 of the photo-SCR 27 to become positive with respect to its anode 50. Such spikes transmitted to the cathode 51 via capacitor 71 serves to immediately extinguish conduction by the photo-SCR. The stability of such cut-off or commutation action is enhanced by the maintenance of the steady voltage at circuit point B connected directly with the anode 50 of the photo-SCR 27. This circuit relation results in clean commutation of the photo-SCR control signal action.

FIGS. 4, 5 and 6 are waveforms of typical signals generated at circuit point A during various control conditions. These curves are drawn with the position of the shutter apertures 21 as reference, along a linear basis with $s$ as abscissa. The shutter wheel 20 is drawn in below FIG. 6, as the common spatial reference. These figures show up differently graphically than those plotted with time as abscissa. The time developed pulses are shown in FIGS. 7, 8 and 9, having variable spacing dependent upon their off-speed relation to that "selected" $N_0$: a slower speed $N_1$ shows the signal pulses as spaced further apart than the "norm" $N_0$; a faster speed $N_2$ results in closer spaced signal pulses. As stated, these signal pulses show up all with the same height and width on the time scale, with the varied spacing when off-speed in an analog relationship.

FIGS. 4, 5 and 6 are developed against the shutter wheel as reference, and illustrate the relation of speed change to aperture 21 position. These spatially related pulses show up with variable widths: At slower speed $N_1$ these signal pulses are seen as narrower than the width of those for the "selected" speed or "norm" $N_0$; and at a faster speed $N_2$ results in a wider signal pulse— all of the same height. FIG. 4 illustrates the signal pulses 75, 75 representing the current (and voltage) at circuit point A, wherein the motor speed and its angular velocity are at the "selected" or desired value $N_0$. The signal pulses 75, 75 are each triggered when the light beam 26 just enters the leading edges 73 of the slotted apertures 21, 21 of the light chopper or shutter wheel 20, (see FIG. 2). When the light impinges upon the photo-SCR 27, it immediately conducts to a predetermined level or height as determined by its anode voltage level, maintained constant at circuit point B.

The initial leg 76 of each pulse 75 is thus seen to substantially coincide with the leading edge 73 of each slot 21, and each be of the same height. The photo-SCR 27 continues to conduct at its peak (square-wave) level 77 beyond the slot 21 extent, and into the opaque regions 22 of shutter wheel 20, until it is extinguished by the generated voltage spike. The unijunction transistor circuit 65 is activated coincidentally with the initiation of the signal rise-leg 76, and the corresponding production of a voltage pulse at point A and to the circuit 65. The R–C time constant 66–67 generates the voltage spike after the predetermined duration, and impresses these cut-off spikes 78, 78 upon the pulses 75, 75. The photo-SCR 27 is thereupon extinguished along decay-leg 79, to complete each pulse at the zero level. The pulse duration is preset to end when the light beam 26 is at the center of the each opaque portion of the wheel 20 when rotating at the "selected" speed $N_0$. This mode is indicated in FIG. 4, and is therefor equal to the time it takes one aperture 21 and half of the sucessive opaque part 22 to pass the beam 26.

FIG. 5 illustrates the pulses 80, 80 that occur when the motor 17 and attached shutter wheel 20 rotate slower $N_1$ than the "selected" or desired speed $N_0$. The "slower" pulses 80, 80 are narrower than the pulses 75, 75 for speed $N_0$. Their rise-legs 76, 76 also start at the beginning edge 73 of each aperture 21. However, due to the slower angular movement of the wheel 20, the cut-off spike signals 81, 81 occur sooner along the opaque positions 22 than center, and the plateaus 82, 82 appear shorter. There is a longer time period between the starts of the pulses 80, 80 as their speed $N_1$ is less than $N_0$. Hence fewer pulses 80, 80 occur per second on the time scale (see FIG. 8). On the other hand, at the faster speed $N_2$ the pulses 85, 85 each extend over a larger section of the opaque portions, along plateaus 86, 86, before being cut-off by the constant-duration-spaced spikes 87, 87, as shown in FIG. 6 (see also FIG. 9). Also more "fast" pulses 85, 85 are generated per second than those 75 at normal speed $N_0$.

In the exemplary system, a shutter wheel 20 about 2.5 inches in diameter was used with sixty slotted apertures 21 alternated with the opaque portions 22. Thus each slot-opaque unit 21–22 extends over 6° of rotation of the wheel 20 and tape drive-shaft 16, and there are sixty control pulses 75, 80 or 85 for each rotation of the motor 17. Of course, fewer or more slots and pulses for each revolution of the drive may be used in a particular application. To provide truly constant linear tape speed and thereby eliminate flutter from the reproduction of the magnetic tape programs, it is necessary to have the motor not only revolve at a constant number of r.p.m., but also have even momentary angular accelerations of its rotor closely controlled and held at essentially zero. The invention control system is directed towards this end.

The control signal pulses generated by the shutter wheel 20 are used to very closely monitor the angular velocity of the motor shaft 16. I have determined that the use of sixty apertures 21 and corresponding pulses 75, 80 or 85 practically eliminates any angular accelerations of the motor with the invention control circuit 30. The resulting angular velocity of the tape capstan-shaft 16 is found to be held constant insofar as is discernable through listening to resultant quality music being played thereby. The motor control system hereof is stable, effective, and maintained over wide ambient changes in environment or voltage.

The time-constant of the R-C unit 66–67 of the unijunction transistor circuit 65 is directly related to the motor shaft 16 speed in r.p.m. and the size and number of apertures 21 of the shutter wheel 20. The linear extent of each aperture 21 and the accompanying opaque areas 22 are equal, in the wheels 20 and 40; but may differ in other cases. As hereinabove stated, the preset time-duration of the spacing between the rise-leg 76 of each pulse and its cut-off spike, 78, 81 or 87, is made equal to the time interval that it takes for one full aperture 21 and one-half of its next contiguous opaque area 22 to move past the light beam 26, when the system is at the "selected" or normal speed $N_0$ for the tape play.

The purpose is for the photo-SCR 27 to remain in conduction, along the plateaus 77, 77 of pulses 75, 75 of normal speed $N_0$, until the center of the next adjacent opaque space 22 is just scanned, see FIG. 4. The photo-SCR thus remains in conduction during the passage of one full aperture 21 across the light beam 26 and for fifty percent of the next dark space 22 during the "selected" speed ($N_0$). Should the commutation spike be timed too early it would be ineffective during the aperture interval as the photo-SCR would not extinguish with light still impinging on it. Should the cut-off spike be timed to take place too late in the aperture cycles, it could coincide with the successive aperture, and be ineffective in the control action. In practice, the commutation pulses are preferably made to occur when the midpoint of the opaque areas 22 are at the light beam 26, although this may differ in particular applications. In this manner the slower and faster mode control pulses 80, 85 can be accommodated for a relatively wide range of control action.

FIGS. 7, 8 and 9 schematically illustrate the waveforms of the control signals as generated at circuit point A with time base $t$ as reference. The voltage level of each pulse reaches the same plateau. The width in-time of each pulse is the same, as it is initiated when the leading-edge of each aperture 21 reaches the light beam 26 and then cut-off or commutated at the preset duration, as set forth hereinabove. FIG. 7 depicts the control signal pulses 90, 90 for the "selected" speed $N_0$ of the shutter wheel 20 and drive shaft 16. FIG. 8 shows the wider spacing, in-time, of the pulses 91, 91 that occurs when the drive is slower than the "normal," at $N_1$. This is because the slower moving apertures 21 create fewer pulses 91, 91 per second. Conversely, the faster speed ($N_2$) mode produces more control pulses 92, 92 per second, that are closer together as shown in FIG. 9.

These generated control pulses 90, 91, 92 appear across potentiometer 53 and resistor 54. Component 53 is the "speed adjustment potentiometer," and is at 1,000 ohms in the exemplary circuit, in series with an 8200 resistor 54. A selected portion of the voltage at point A is applied to point C via tap 59 through resistor 61, and thus across capacitor 60. The resistor 61 and capacitor 60 form a filter network to filter the intermittent pulsed control voltages thus applied. This filter 60–61 filters the control waveforms 90, 91, 92 to essentially contant direct current speed analog signals. As the pulses 90, 91, 92 all have the identical heights and widths, the net average DC value of the resultant control voltages at circuit point C is directly a function of the speed of the aperture wheel 20 in r.p.m. and angular velocity.

At the selected speed $N_0$, the rectified analog voltage is at the $V_0$ level or value as seen in FIG. 7. That for the slower speed $N_1$ is at the lower magnitude $V_1$, see FIG. 8. Faster speed $N_2$ of wheel 20 produces closer and more pulses 92 per second, and the correspondingly higher control voltage $V_2$, as seen in FIG. 9. The time constant of the resistor-capacitor filter 60–61 should not be made too long, as the resultant control lag would make tight or close control of the motor speed difficult. In the exemplary system resistor 61 is 10,000 ohms, and capacitor 60 1.0 microfarads. These filter components 60–61 should preferably be environment stable. The capacitor 60 is advantageously made of "Mylar" material. In practice excellent motor speed control is attained, with close angular speed constancy due to the relatively large number of analog pulses 90, 91, 92 generated per aperture wheel 20 turn, and direct, effective and sensitive control of the motor 17 provided by the control circuit hereof responsive to the resultant control signals.

The direct-current control signals thus appearing at circuit point C are directly applied to Zener diode 95. When the voltage magnitude V of the DC signal thus applied to diode 95 exceeds its Zener value, conduction occurs therein. The base 97 of transistor 96 is directly coupled with the Zener diode, and is driven into conduction when the Zener diode 95 is rendered conductive. The normally conducting transistor 98 is driven out of conduction when transistor 96 conducts, which in turn also causes output transistor 100 to cease conduction. Current to motor 17 is thereupon stopped. Towards this end emitter 101 of transistor 96 is connected to negative bus 38, and its collector 102 to positive bus 37 through resistor 103. The base 104 of transistor 98 is directly coupled to collector 102 by coupling resistor 105, with its emitter 106 being connected to the negative line. Transistor 98 is normally biased to be in conduction while transistor 96 is quiescent. When transistor 96 is rendered conductive upon Zener diode 95 activation the voltage on base 104 drops to cut off transistor 98.

Transistors 96 and 98 in the exemplary circuit are of the NPN type, such as the Ti 418, with DC betas of the order of 400 to 500. The output transistor 100 is of the PNP type with a beta of about 175. Its base 107 is directly coupled to collector 108 through resistor 109 whereby the conduction level of output transistor 100 is controlled by the transistor 98. The resistor 110 connecting resistor 109 and base 107 to the positive bus is advantageously of relatively low value, as 100 ohms. Thus base 107 is substantially at the positive bus voltage to keep transistor 100 cutoff except while transistor 98 is in its high conduction phase. As transistor 98 is normally biased to be in conduction, output transistor 100 conducts when the analog D.C. voltage V at circuit point C is below "control" value. The tape D.C. motor 17 is thereupon energized by current flowing through collector 111 of transistor 100. Such motor drive energy is supplied to move the tape at its rated playback speed.

When the motor speed rises above the "selected," normal speed $N_0$, its DC analog voltage V correspondingly rises (see FIG. 9) sufficiently to exceed the Zener value of diode 95 and thereby activate transistor 96. The transistors 98 and 100 are directly cutoff and current being supplied to motor 17 stops directly. This action permits the motor to start slowing. When the motor speed thereupon reaches its target $N_0$ the control voltage $V_0$ then generated, in the exemplary system, is below the Zener 95 value, and transistor 96 resumes its quiescence while the transistors 98 and 100 again conduct and energy is supplied to motor 17.

A bias diode 112 connects the emitter 113 of output transistor 100 to the positive line 37 to allow its base 107 to be slightly positive with respect to the emitter 113. This affords a cleaner cutoff of transistor 100 at higher temperatures. An electrolytic capacitor 114 across transistor 100 and diode 112 is a noise filter bypass to provide electrically quieter operation of the motor. A diode 115 across the motor 17 conducts during negative-going inductive kicks from the motor to further quiet potential interference, and recover energy that otherwise would be lost.

A thermistor 116 in series with a resistor 117 are connected between the Zener diode 95 and the negative bus 38. The thermistor 116 serves to compensate for system operation at cold temperatures. When the ambient temperature is significantly reduced, as in an automobile in wintry weather, the resistance of thermistor 116 increases, thus reducing some of the loading as seen by the Zener diode 95. The voltage input as seen at the base of transistor 96 is correspondingly higher with colder temperature to offset the tendency of the transistor to become less sensitive. Also the thermistor offsets the tendency of the Zener diode 95 to have enhanced Zener voltage level at colder temperature. To obtain practical immunity as to temperature effects, the Zener diodes hereof 46, 56, 95 used preferably have Zener ratings of the order of 5 to 6 volts.

In accordance with the present invention precise, practically constant magnetic tape speed is accomplished, despite variations or changes at the supply voltage source 36, wide differences in environmental conditions as temperature and humidity, mechanical impacts, bumps in riding, and even warpage in the tape cartridge 15. The speed $N_0$ for the motor 17 operation is "selected" by suitably setting the tap 59 on potentiometer 53. The apertured wheel 20 initiates the signal pulses as described in connection with FIGS. 4 to 9, generating an analog DC voltage level corresponding to the motor 17 and therefore magnetic tape speed. When the tapped-off analog voltage, as applied to circuit point C, just exceeds the Zener voltage of the diode 95, transistor 96 is "turned-on" and the transistors 98 and 100 directly drop out of conduction. The current through motor 17 is thus cut-off and its speed slows down until the analog voltage at point C reaches below the Zener value at 95. The normally conducting transistors 98, 100 resume and reenergize the motor.

The invention system is a velocity control loop found to be very effective in controlling the speed of the motor. The transistors 96, 98, 100 are of high gain. An even extremely small change in the DC speed analog voltage causes a large change in the operating energization of the motor 17. In practice, the drive system hereof affords a speed constancy to the driven magnetic tape that provides excellent musical and stereophonic reproduction. Effects of flutter, "wow," eccentricities in mechanism, and the like are eliminated or minimized to below audible notice. Perturbations or angular accelerations are so closely monitored by the multi-apertured wheel 20 as to have no deleterious results.

Although the invention hereof has been set forth and described in specific embodiment and application, it is to be understood that variations and modifications thereof may be made within the broader spirit and scope of the invention, as set forth in the following claims.

I claim:

1. A control system for driving a motor at a uniform speed of rotation comprising sensor means coupled to the motor providing pulses at a rate proportional to its speed of rotation, circuit means responsive to the sensor pulses for producing a series of corresponding like electrical pulses that are spaced apart in-time in accordance with the motor speed, means converting the said electrical pulses series into a control signal of magnitude corresponding to their said in-time spacing, and amplifying means responsive to the control signal and in circuit with the motor for supplying current thereto in amounts to maintain its speed substantially constant.

2. A control system for operating a direct current motor at a predetermined uniform angular speed of rotation for driving a magnetic tape at a constant linear speed, comprising sensor means driven by the motor and providing pulses at a rate proportional to the said angular speed, electronic circuit means responsive to the sensor pulses for generating an electrical signal pulse in correspondence with the start of each said sensor pulse to establish an analog series of like electrical pulses that are spaced apart in-time in accordance with the angular speed of the motor, rectifying means for converting the said analog pulse series into a direct current control signal of magnitude corresponding to their said in-time spacing and amplifying means in circuit with the motor for supplying power thereto in response to the control signal to maintain its angular speed at substantially zero acceleration and thereby drive the magnetic tape with minimal flutter.

3. A control system for driving a motor at a constant predetermined speed of rotation comprising sensor means coupled to the motor providing pulses at a rate proportional to its speed of rotation, circuit means responsive to the sensor pulses for initiating an electrical current pulse in coincidence with the start of each said sensor pulse, means responsive to the initiation of each of said electrical current pulses for controlling their duration in-time to a predetermined extent to establish a series of like electrical pulses that are spaced apart in-time corresponding to the motor speed, means for converting the said electrical pulse series into a control signal for the motor operation of magnitude corresponding to their said in-time spacing, and amplifying means responsive to the control signal and in circuit with the motor for supplying current thereto in amounts to maintain its speed substantially constant.

4. A control system for operating a direct current motor at a uniform angular speed of rotation for directly driving a magnetic tape at a constant linear speed, comprising optical sensor means driven by the motor for providing optical pulses at a rate proportional to the angular speed of the motor rotation, electronic circuit means responsive to the optical pulses for triggering an electrical signal pulse in synchronism with the start of each said optical pulse, timing means responsive to the initiation of each of said electrical signal pulses for providing a cut-off voltage at a preset time interval after the start of each of said electrical pulse to control their duration in-time to a predetermined extent and establish a series of like electrical pulses that are spaced apart in-time in accordance with the angular speed of the motor, rectifying means for converting the said electrical pulse series into a direct current control signal for the motor operation of magnitude corresponding to their said in-time spacing, and amplifying means in circuit with the motor for supplying power thereto in response to the control signal in amounts requisite to maintain its rotational speed at substantially zero acceleration and thereby drive the magnetic tape with minimal flutter.

5. A control system for operating a direct current motor at a constant predetermined speed of rotation for driving a magnetic tape at a uniform linear speed, comprising optical sensor means coupled to the motor providing pulses of light at a rate proportional to the speed of rotation of the motor, electronic circuit means responsive to the said pulses of light for initiating an electrical pulse in coincidence with the start of each said light pulse, timing means responsive to the initiation of each of said electrical pulses to provide a cut-off voltage spike at a preset time interval after the start of each of said electrical pulses for controlling their duration to a predetermined extent and thereby establish an analog series of like electrical signal pulses that are spaced apart in-time in accordance with the speed of the motor, rectifying means for converting the said analog pulse series into a direct current control signal for the motor operation of magnitude corresponding to their said in-time spacing, and amplifying means responsive to the control signal and in circuit with the motor for supplying current thereto in amounts requisite to maintain its rotational speed substantially constant and thereby drive the magnetic tape with minimal flutter.

6. A control system as claimed in claim 1, in which said circuit means includes a silicon controlled rectifier triggered by the said sensor pulses to produce the corresponding electrical pulses.

7. A control system as claimed in claim 3, in which said circuit means includes a silicon controlled rectifier triggered by the said sensor pulses to directly produce the corresponding electrical pulses with a sharp rise and a uniform plateau characteristic.

8. A control system as claimed in claim 4, in which circuit means includes a photo-activated silicon controlled rectifier triggered by said optical pulses to produce the corresponding electrical pulses.

9. A control system as claimed in claim 5, in which said electronic circuit means includes a photo-activated silicon controlled rectifier triggered by the said light pulses at their respective leading edges and directly producing the corresponding electrical pulses with a uniform plateau characteristic.

10. A control system as claimed in claim 4, in which said sensor means includes a shutter wheel with apertures spaced in circular array each with a leading edge to initiate its optical pulse.

11. A control system as claimed in claim 5, in which said sensor means includes a shutter wheel with apertures spaced in circular array each with a leading edge that passes across a light beam to initiate its light pulse.

12. A control system as claimed in claim 3, in which said means for controlling the electrical pulse comprises a unijunction transistor energized upon the initiation of each said electrical pulse.

13. A control system as claimed in claim 4, in which said timing means for providing a cut-off voltage comprises a unijunction transistor energized upon the initiation of each said electrical pulse, and a resistor-condenser in timing circuit relation with said unijunction transistor.

14. A control system as claimed in claim 5, in which said timing means for controlling the electrical pulse duration comprises a unijunction transistor energized upon the initiation of each said electrical pulse, and a resistor-condenser in timing circuit relation with said unijunction transistor to produce the cut-off voltage spike at the preset intervals.

15. A control system as claimed in claim 7, in which said means for controlling the electrical pulse duration comprises a unijunction transistor energized upon the initiation of each said electrical pulse, a resistor-condenser in timing circuit relation with said unijunction transistor to produce a cut-off voltage spike at the preset intervals, and a circuit connection presenting the voltage spikes to the base of said silicon controlled rectifier.

16. A control system as claimed in claim 9, in which said means for controlling the electrical pulse duration comprises a unijunction transistor energized upon the initiation of each said electrical pulse, a resistor-condenser in timing circuit relation with said unijunction transistor to produce the cut-off voltage spikes at the preset intervals, and a circuit connection presenting the voltage spikes to the base of said photo-activated silicon controlled rectifier.

17. A control system as claimed in claim 10, in which the said preset time interval is equal to the time required for the passage of a full aperture and substantially half of its successive opaque region of the shutter wheel across a light beam when the motor is at its said uniform angular speed.

18. A control system as claimed in claim 11, in which the said preset time interval is equal to the time required for the passage of a full aperture and substantially half of its successive opaque region of the shutter wheel across the light beam when the motor is at its said predetermined rotational speed.

References Cited

UNITED STATES PATENTS

| 3,005,940 | 10/1961 | Johnson | 318—313 X |
| 3,154,730 | 10/1964 | Houldin et al. | 318—313 X |
| 3,239,741 | 3/1966 | Rank | 318—313 |
| 3,268,788 | 8/1966 | Branco | 318—313 X |

OTHER REFERENCES

G.E. SCR Manual, 3rd Ed., Auburn, N.Y. Mar. 23, 1964. P. 209 to 213 relied upon.

ORIS L. RADER, *Primary Examiner.*

J. J. BAKER, *Assistant Examiner.*